F. A. BINDER.
PHOTOGRAPHIC ROLL FILM DEVELOPING APPARATUS.
APPLICATION FILED OCT. 12, 1914.
1,159,565.
Patented Nov. 9, 1915.
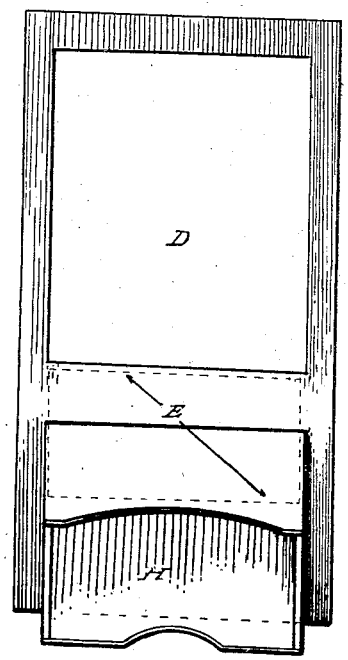
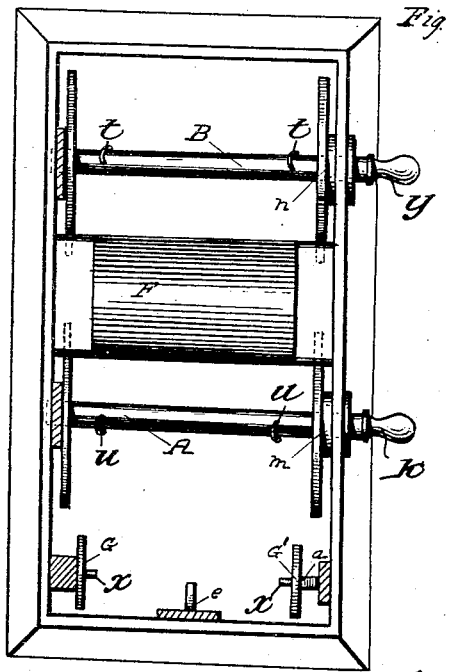
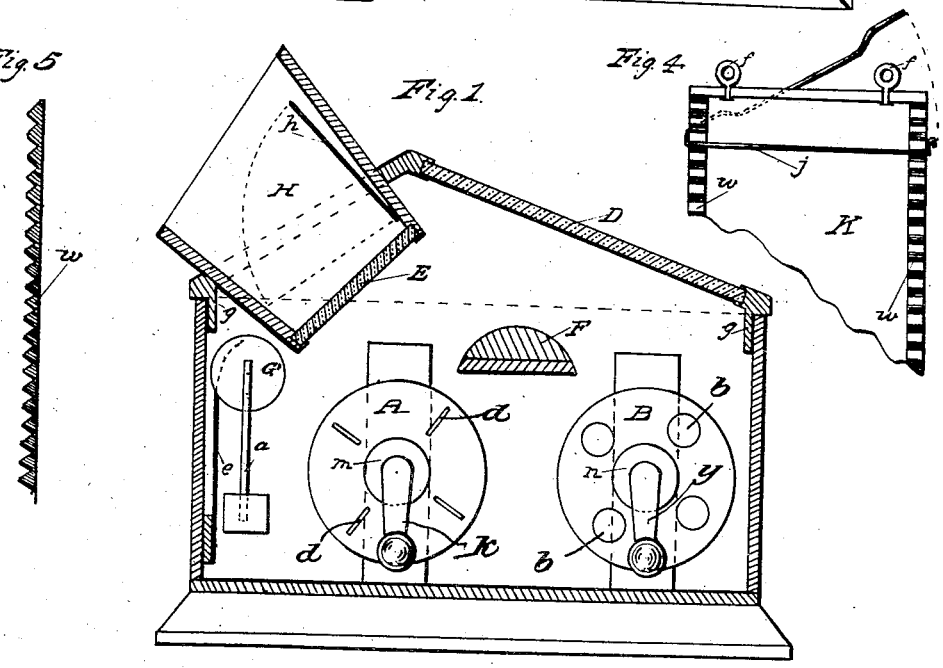
WITNESSES
Samuel Posner
Johana Binder
Francis Binder
INVENTOR.

UNITED STATES PATENT OFFICE.

FRANK A. BINDER, OF NEW YORK, N. Y., ASSIGNOR TO ANSCO COMPANY, OF BINGHAMTON, NEW YORK, A CORPORATION OF NEW YORK.

PHOTOGRAPHIC-ROLL-FILM-DEVELOPING APPARATUS.

1,159,565.     Specification of Letters Patent.     Patented Nov. 9, 1915.

Application filed October 12, 1914. Serial No. 866,401.

*To all whom it may concern:*

Be it known that I, FRANK A. BINDER, a citizen of the United States, residing at 221 East Thirty-third street, in the city and county of New York and State of New York, have invented a new and useful Photographic-Roll-Film-Developing Apparatus, of which the following is a specification.

My invention relates to improvements in photographic developing machines in which the developing process is performed under daylight or artificial light, and the object of my improvement is to make the film visible to the operator during development, and thus avoid under or over-development, which so far, I believe, was possible only by the more inconvenient dark room method.

I attain this object by the mechanism illustrated in the accompanying drawing, in which—

Figure 1 is a vertical section of the machine showing the tank with cover in place; with the near side of tank and cover and of viewing device in cover removed to show inside parts; Fig. 2 is a top plan view of the tank without the cover; Fig. 3 is a top plan view of the cover; Fig. 4 is a top plan view of the carrying band, hereinafter called the apron, and Fig. 5 is a sectional view of a grooved strip attached to both edges of apron along its entire length.

Same parts are designated by the same letters throughout the several views.

The cover, Fig. 1 and Fig. 3, is provided with a viewing device H, through which the interior of the tank can be seen through orange colored transparent glass E. I prefer the use of orange colored transparent glass in the viewing device, but any shade of glass or transparent material that is proof against actinic light may be used here. Sufficient light to observe the film, and distinguish the various objects on same, in the course of development, is brought into the tank through the glass top D, which is of ruby red colored transparent glass. This light will not injure the film.

The tank, Fig. 1 and Fig. 2, is provided with two spools or reels A and B. Both flanges of reel A are provided with small narrow openings *d* to allow developing solution to flow through without sufficient light entering to injure the film when the cover is lifted. The flanges of reel B are also provided with fluid openings *b*, but much larger, as the film is not on this reel when the cover is off during the course of development, or hereinafter more fully explained.

The viewing device H is provided with a shutter *h*, which may be lowered over glass E when the operator is not observing the film.

The extension of the cover *g* protruding into the tank is on all four sides to prevent light coming in between the tank and the cover.

The apron, Fig. 4, may be made of such pliable materials as rubber, celluloid, canvas or oilcloth. The entire length of this apron cannot here be illustrated, but it is of sufficient length to go around the film so that the light does not strike said film. Rings *f*, and wire belt *j* are provided at both ends of apron.

The inside of tank, cover and viewing device is preferably painted black.

The film is prepared and development performed in the following manner; the end of apron K, with the side having grooved strip *w* downward, is attached to axle of reel B, by means of rings *f* and hooks 7 on axle; the crank *y* turned to the right, and the entire length of apron rolled on reel. The other end of the apron is then carried over crosspiece F and attached to axle of reel A in the same manner as it was attached by means of rings *f* and hooks *u* to reel B. Film roll, with the end leading from the top, is to be inserted into spool carriers G and G', one of which G is held by vertical spring *a*, and can be pressed back so that pins *x* of spool carrier can be inserted into the spool. Vertical spring *e* holds the film roll firm. The end of film protecting paper to which film is attached, is inserted under wire belt *j* which will hold it to the apron. The cover is placed upon the tank, and the apron with the film strip inside is rolled on reel A by turning crank *k* of said reel A left. The cover is lifted, and the other end of film protecting paper is inserted under wire belt J. Thus the film is now attached at both ends to apron. The wire belts are so arranged that they may be moved up or down on apron according to the length of film; Fig. 4.

The developing solution is now pored into the tank, and the cover is again placed in position. By turning the crank *y* of reel B to the right, the film can be observed through viewing device H, as it is carried by apron over crosspiece F. The film may be rolled back and forth from one reel to the other until sufficiently developed, when the cover is removed, and the film is taken out and "fixed" in the usual manner.

Various shades of ruby, red, orange or yellow colored glass may be used to bring non-actinic light into the developing machine, or two or more colors may be used together in top of the cover for this purpose.

I claim:

1. In an apparatus for developing photographic films, the combination with a suitable casing and a cover adapted to fit thereon, of a viewing device mounted in said cover, said viewing device provided at one end with suitable actinic-proof material; reels A and B rotatably mounted within said casing; hooks attached to the said reels for the purpose of connecting a flexible apron to said reels; and cranks attached to said reels for the purpose of rotating the same from the outside of said casing.

2. In an appartus for developing photographic films, the combination with a suitable casing open at the top, and a removable cover adapted to fit thereon, of a viewing device mounted in an opening in said cover; a glass, proof against actinic light, provided at one end of said device; reels A and B having fluid passages in the flanges rotatably mounted within said casing; and means for rotating the said reels within the said casing.

3. In an apparatus for developing photographic films, the combination with a suitable casing, and a cover adapted to fit thereon, of a viewing device having an opening formed therein, mounted in said cover; suitable actinic-proof material provided at one end of said device over the said opening thereof; reel A having film protecting flanges with suitable fluid openings therein, rotatably mounted within said casing; reel B also mounted within said casing; and turning cranks attached to said reels.

4. In an apparatus for developing photographic films, the combination with a casing, and a cover adapted to fit thereon, of an observation device H mounted in said cover, said observation device having a viewing opening formed therein; an actinic-proof glass provided at one end of said device; a light-proof shutter pivotally mounted within the openings of said observation device, as protection against actinic light; and reels A and B rotatably mounted within said casing.

5. In an apparatus for developing photographic films, the combination with a suitable casing and a cover adapted to fit thereon, of a veiwing device having at one end suitable actinic-proof material, mounted in said cover; a glass, proof against actinic light, mounted in the top of said cover for the purpose of admitting light into the apparatus to aid in viewing the development of the film; and rotary devices A and B mounted within said casing.

6. In a developing apparatus for photographic films, the combination with a suitable casing open at the top, of a cover adapted to fit thereon said cover having an upward sloping top and side pieces corresponding thereto; a viewing device provided at one end with a glass that is proof against actinic light, mounted in said cover; a suitable actinic-proof glass fitted over an opening in the top of said cover; and two reels rotatably mounted within said casing.

7. In a developing apparatus for photographic films, the combination with a suitable casing open at the top, of a cover adapted to fit thereon having an upward sloping top and side pieces corresponding thereto, the said cover having suitable openings formed therein; a viewing device provided with a suitable actinic-proof glass, mounted in said cover in one of the said openings; an actinic-proof glass mounted over the other opening in said cover, for the purpose of admitting light into the apparatus; and film-roll holders adapted to hold a roll of photographic film, mounted within said casing.

8. In an apparatus for developing photographic films, the combination with a casing, and a cover adapted to fit upon said casing, of a viewing device mounted in said cover, said viewing device being provided at one end with suitable transparent material which will arrest the passage of actinic rays of light through said viewing device; two reels rotatably mounted within said casing; film-roll holders adapted to support a spool containing a strip of flexible photographic film, attached within said casing; and a spring e also provided within said casing for the purpose of holding the contents of said film-roll holders firmly thereon.

9. In a developing apparatus for photographic films, the combination with a suitable casing, and a cover adapted to fit thereon, of a viewing device fitted at one end with an actinic-proof transparent glass, mounted in said cover; reels A and B rotatably mounted in said casing; a flexible apron having raised separating strips w at the edges thereof, attached at the ends to said reels; and a crosspiece F mounted within said casing for the purpose of so directing the course of the said apron and the film carried thereon as to pass before the said viewing device.

10. In an apparatus for developing photographic films, the combination with a casing, and a cover adapted to fit thereon, of a viewing device provided at one end with a suitable actinic-proof glass, mounted in said cover; two reels rotatably mounted in said casing; a flexible film protecting apron having raised strips at the edges thereof, attached at the ends to said reels; devices *j* provided upon said apron for the purpose of attaching the ends of a film protecting covering, to which the film is attached, to said apron; and film-roll holders mounted within said casing.

11. In a developing apparatus for photographic films, the combination with a casing, and a cover adapted to fit upon said casing, of a viewing device mounted in said cover, said viewing device being provided at one end with an actinic-proof glass; two reels mounted rotatably within said casing; a crosspiece attached within said casing over the said reels; film-roll holders also attached within said casing; a flexible apron having raised strips at the edges, attached at the ends to said reels; means for winding said apron and a strip of flexible photographic film together upon one of said reels; and means for transferring the film, supported by said apron, to the opposite reel so that the film passes over said crosspiece.

12. In an apparatus for developing photographic films, the combination with a casing open at the top, and a cover adapted to fit thereon, of a viewing device provided at one end with suitable transparent actinic-proof material, mounted in said cover; two reels rotatably mounted in said casing; film-roll holders also mounted in said casing; a flexible apron having raised separating strips at the edges thereof, attached at the ends to said reels; film fastening devices provided upon said apron; means for winding said apron and a strip of photographic film together upon one of said reels; and means for winding the said apron, with the film held at both ends thereto, upon the opposite reel.

13. In an apparatus for developing photographic films, the combination with a casing, and a flexible apron having separating strips at the edges, mounted within said casing, of a film fastening device provided upon said apron.

14. In a developing apparatus for photographic films, the combination with a casing, and a flexible apron having raised strips attached at the edges, mounted within said casing, of a film fastening device provided upon said apron; and means for adjusting the said device upon said apron according to the length of the film.

15. In an apparatus for developing photographic films, the combination with a suitable casing, and a cover adapted to fit thereon; of a viewing device mounted in said cover; an actinic-proof glass fitted at one end of said device; two reels rotatably mounted in said casing; an apron provided with loops *f* at the ends connected to said reels, the body portion of said apron being formed of flexible rubber and provided at the edges with flexible separating strips; and film fastening devices provided upon said apron.

16. In an apparatus for developing photographic films, the combination with a suitable casing, and a cover adapted to fit thereon; of a viewing device mounted in said cover; an actinic-proof glass provided at one end of said device, said glass being wholly within the inner space of the apparatus as formed by the sides of the casing and cover respectively, as protection against actinic light rays; and two reels rotatably mounted in said casing.

17. The combination in an apparatus for developing photographic films, of a suitable casing; two reels rotatably mounted in said casing; a crosspiece attached within said casing over the said reels; film-roll holders also mounted in said casing; a flexible actinic-light proof apron having separating strips at the edges, connected at the ends to said reels; a cover adapted to fit upon said casing; a viewing device provided at one end with an actinic-proof glass, mounted in said cover; a strip of actinic-proof material mounted in the top of said cover; and film fastening devices provided upon said apron.

18. The combination in an apparatus for developing photographic film rolls, of a suitable casing open at the top; reels A and B rotatably mounted in said casing and having flanges provided with fluid passages therein; hooks attached to the axles of said reels; turning cranks also attached to said reels; film-roll holders mounted within said casing; a crosspiece F also mounted the casing; a flexible film protecting apron attached at the ends to said reels, said apron provided with grooved separating strips at the edges; film fastening devices provided upon said apron; a cover adapted to fit upon said casing and having an upward sloping top and sidepieces corresponding thereto; a viewing device having an actinic-proof glass fitted at one end, mounted in said cover; a shutter hinged within said viewing device; and a suitable actinic-proof glass mounted in the top of said cover.

FRANK A. BINDER.

Witnesses:
CONRAD E. BAUER,
LORENZ BAUER.